United States Patent [19]

Jay

[11] Patent Number: 5,032,417
[45] Date of Patent: Jul. 16, 1991

[54] METHOD FOR PROCESSING CHEESE

[75] Inventor: Jeffrey L. Jay, Annandale, Minn.

[73] Assignee: Sherping Systems, Inc., Winstead, Minn.

[21] Appl. No.: 546,554

[22] Filed: Jun. 29, 1990

Related U.S. Application Data

[62] Division of Ser. No. 410,073, Sep. 20, 1989.

[51] Int. Cl.$^5$ ............................................. A23C 19/00
[52] U.S. Cl. ..................................... 426/495; 426/582
[58] Field of Search ............... 426/495, 491, 582, 517; 99/456, 459, 462, 465

[56] References Cited

U.S. PATENT DOCUMENTS 3,887,718  6/1975  Hinds .................................. 426/495
4,309,941  1/1982  Brockwell ........................... 426/495

Primary Examiner—George Yeung
Attorney, Agent, or Firm—Dorsey & Whitney

[57] ABSTRACT

A method and apparatus for continuously processing cheese curd forms the cheese curd into a series of ribbons on a conveyor belt used to separate the whey from the cheese curd and then uses a series of plowshares, augers or other deflection means to displace or rotate the ribbons onto bare segments of the conveyor belt to enhance the draining of the whey from the cheese curd.

2 Claims, 4 Drawing Sheets

METHOD FOR PROCESSING CHEESE

This is a divisional of application Ser. No. 410,073, filed Sept. 20, 1989.

TECHNICAL FIELD

The present invention relates generally to the field of cheese processing equipment. More particularly, the present invention relates to a method and apparatus for continuously processing cheese curd by forming the cheese curb into a series of ribbons on a conveyor belt used to separate the whey from the cheese curd and then using a series of plowshares or other deflection means to displace the ribbons onto bare segments of the conveyor belt to enhance the draining of this operation.

BACKGROUND ART

In recent years, conventional cheese processing has been mechanized to improve the performance and efficiency of cheese manufacture. Several cheese making systems have been introduced for the continuous processing of raw cheese curd, including the draining of the whey from the raw cheese curd and the fusing, matting and subsequent milling of the cheese curd.

U.S. Pat. Nos. 3,636,630 and 4,217,818 describe continuous systems for the manufacture of cheese in which the curds and whey are separated either just before or on the first of two conveyor belts that may be of either a perforated or non-perforated material. After traveling the length of the first conveyor, the curd is inverted onto the second conveyor where further matting takes place. At the end of the second conveyor milling or transfer to an external milling device occurs.

Although these systems allow for the continuous drainage of the cheese curd, the curd must be deposited on the conveyor in a layer thin enough to allow the whey to be drained from the curd without agitation. If a layer more than about 3" thick is used with such a system, whey may be trapped in pockets of the cheese curd. This limitation leads to cheese processing systems that are either very large or have a relatively low throughput because of the amount of conveyor belt area required to drain the cheese curd. In addition, such systems are also limited in their production of matted cheese curds.

U.S. Pat. No. 4,389,941 describes a continuous system for the manufacture of cheese in which the curds and whey are separated by means of an inclined screen and the curd is further dried by means of peg stirrers as it travels along a first conveyor belt. At the end of the first conveyor belt, the curd is transferred to two consecutive matting or stirring belts before passing through an internal milling device to be salted.

This system may be operated with a much thicker curd layer (8-10") due to the enhanced drainage caused by the use of peg stirrers, thereby decreasing the overall size of the system for a given throughput of product. The use of peg stirrers also allows for the manufacture of several different types of cheese than could be accomplished with the previous systems. Unfortunately, the use of peg stirrers in the early stages of curd drainage tends to shatter the larger curd granules. Resulting in an associated loss of butterfat and moisture. This causes significant difficulties when attempting to manufacture high moisture cheese varieties using such a system.

Although the present systems for the continuous manufacture of cheese are adequate for the production of certain type of cheese varieties, it would be desirable to have a continuous cheese processing system that maximizes the drainage of the whey from the curd while minimizing the amount of mechanical damages to the curd and was also capable of manufacturing both low and high moisture cheese varieties while minimizing the overall size of the cheese processing system.

SUMMARY OF THE INVENTION

The present invention relates to a method and apparatus for continuously processing raw cheese curd, consisting of cheese curd and whey. The raw cheese curd is formed into a plurality of continuous ribbons on a conveyor belt, each ribbon comprising a strip of raw cheese curd and an associated strip of bare space. The conveyor belt receives the ribbons of raw cheese curd and transports the ribbons while allowing the whey to drain from the cheese curd. The ribbon formation process of the present invention permits operation of the cheese processing system at layer depths of 6-8", thereby minimizing the overall size of the cheese processing system for a given throughput of product.

One or more plowshares or other deflection means are located across the conveyor belt for plowing the ribbons so that strips of raw cheese curd are displaced into their associated strips of bare space, thereby enhancing the natural drainage of the whey from the cheese curd without the risk of mechanical damage associated with peg stirrers. One or more additional series of deflection means may be positioned downstream on the conveyor belt to further drain and thereby firm the cheese curd until it is able to be agitated by peg stirrers without sustaining damage.

In the preferred embodiment, the raw cheese curd is supplied as a continuous layer and is formed into ribbons on the conveyor belt by a series of generally triangular-shaped dividers or other means. As the ribbons of raw cheese curds travel along the conveyor belt, they are displaced by a series of static plowshare-like blades mounted in a row across the conveyor belt. In another embodiment, a row of slowly rotating propeller-like augers is used to rotate the strips of cheese curd into their associated strips of bare space on the conveyor belt.

In a different embodiment, the layer of cheese curd is not separated into ribbons prior to deflection. Instead, the first set of plowshares or augers are used to split the layer of cheese curd into strips as it is being rotated or displaced and a subsequent row of plowshares or augers is used to deflect the ribbons into their associated strips of bare space on the conveyor belt.

In still another embodiment, the cheese curd is supplied to the conveyor belt as a series of ribbons created by a series of outlet pipes pumping the cheese curd onto the conveyor belt. Again, a row of plowshares or augers is then used to deflect the ribbons into their associated strips of bare space on the conveyor belt.

Cheese processing systems utilizing the present invention may also include additional mechanisms to stir or mat the cheese curd prior to discharge. Water sprays may be introduced to wash the cheese curd at any stage during the process and common salt in the form of particles or brine solution may also be added to the curd at any point during the process.

Accordingly, it is a primary objective of the present invention to provide a method and apparatus for continuously processing cheese that maximizes the natural drainage of the whey from the curd while minimizing the amount of mechanical damage to the curd.

Another objective of the present invention is to provide a method and apparatus for continuously processing cheese that is capable of manufacturing both low and high moisture cheese varieties.

A further objective of the present invention is to provide method and apparatus for continuously processing cheese that minimizes the overall size of the cheese processing system.

These and other objectives of the present invention will become apparent with reference to the drawings, the detailed description of the preferred embodiment and the appended claims.

DESCRIPTION OF THE DRAWINGS

FIG. 4 is a fragmentary perspective view of an alternate embodiment of the plowshare blade deflection means of the present invention.

FIG. 5 is a fragmentary perspective view of an alternative embodiment showing a straight blade deflection means.

FIG. 6 is a fragmentary perspective of another alternate embodiment showing an auger blade deflection means.

DESCRIPTION OF THE PREFERRED EMBODIMENTS

Figure 1:
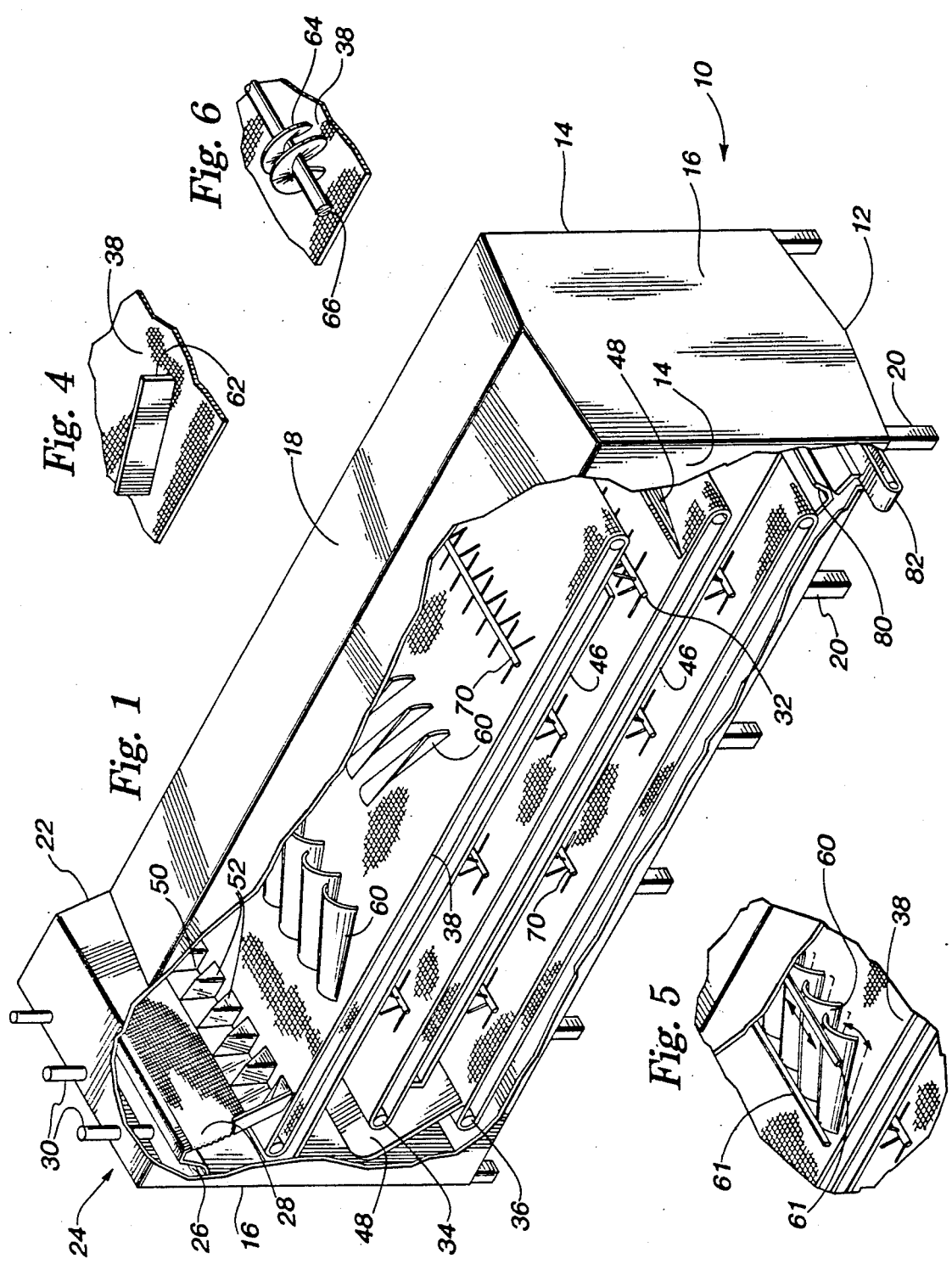
FIG. 1 is a cut-away isometric view of a cheese processing apparatus in accordance with the present invention.

Referring now to FIG. 1, the preferred embodiment of the present invention will be described. The cheese processing apparatus for continuously processing raw cheese curd consisting of cheese curd and whey is constructed in an enclosed housing 10 made of stainless steel or other corrosion resistant material. The housing 10 comprises a bottom pan 12 that is V-shaped in cross-section to allow for drainage of fluids to the center of the bottom pan 12, two vertical side walls 14, two vertical end walls 16 and a top section 18. In the preferred embodiment, the housing 10 is supported by a plurality of legs 20 to allow for access to the underside of the bottom pan 12. As shown best in FIG. 7, the height of the legs 20 may be adjusted to provide gravitational drainage of the whey from the bottom pan 12. Other means of supporting the housing 10 may be used such as mounting the housing directly on footing in the floor or suspending the housing from ceiling of the building where it is located. In the embodiment shown in FIG. 1, the dimensions of the housings 10 are 44'×12' and stands 13' high. One advantage of the dimensions of the housing 10 for the cheese processing apparatus of the present invention is that, unlike some of the prior art processing systems, the present invention may be assembled off-site and shipped to the manufacturing location for installation, rather than being assembled and built within the factory.

Figure 3:
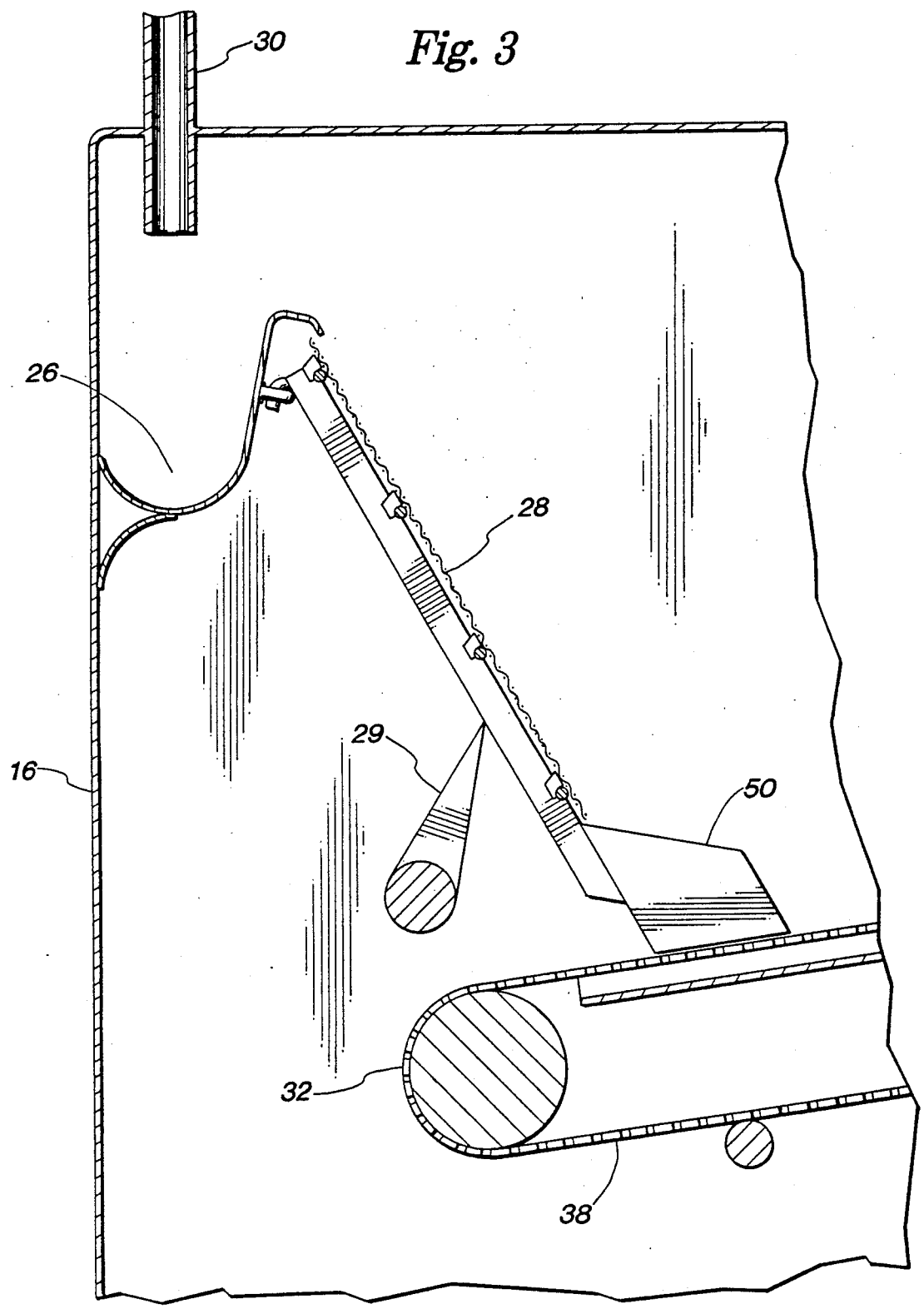
FIG. 3 is a fragmentary side elevation sectional view of the supply means of the present invention.

In the preferred embodiment, the top section 18 includes an elevated portion 22 to accommodate a supply means 24 for supplying the slurry of raw cheese curd to the cheese processing apparatus. Referring now to FIGS. 1 and 3, the supply means 24 comprises a distribution trough 26, an inclined draining screen 28 comprised of a wedge wire or perforated stainless steel screen and one or more raw curd inlets 30 that are disposed in the elevated portion 22 and connected to a vat or other source (not shown) for supplying the raw cheese curd to the distribution trough 26. The downstream side of the distribution trough 26 acts as a weir providing the slurry of raw curd to the draining screen 28. The primary separation of the whey from the curds takes place via the weir and the draining screen 28. The inclined draining screen 28 may be set an angle of 45°–60° from horizontal by operation of the pivot means 29 frictionally engaging draining screen 28 and sliding the lower end of the supply means 24 along the draining belt 32.

Although the supply means 24 used as the supply and primary separation means for raw cheese curd in the preferred embodiment distribution consists of the distribution trough 26 and inclined draining screen 28, it should be understood that other means for supplying the raw cheese curd could be used without departing from the scope of the present invention. The distribution trough 26 could be eliminated or the inlets 30 could enter the distribution trough horizontally or tangentially, rather than vertically. It would also be possible to pump the raw cheese curd slurry into a trough in order to form a continuous layer of cheese curd. In still another embodiment, the raw cheese curd could be pumped directly onto the draining belt 32 in ribbons by spacing a series of inlets 30 across the draining belt 32.

In the preferred embodiment shown in FIG. 1, there are three endless conveyer belts located within the housing 10: a top draining belt 32, and a second and third matting belts 34 and 36. In the embodiment shown in FIG. 1, the belts 32, 34 and 36 are positioned longitudinally in the housing 10 in a vertically spaced relationship with one another. In the low-profile alternate embodiment shown in FIG. 8, the height of the housing 10 is reduced and the length increased by positioning both the draining belt 32 and the first of the matting belts 34 on the same level. In this embodiment, the draining belt 32 is slightly inclined to position the downstream end of the draining belt 32 above the start of the matting belt 34.

Each conveyer belt 32, 34, and 36 includes an endless belt 38 that is water permeable. In the preferred embodiment, the endless belt 38 is formed of a series of plastic slats joined together with plastic pins such as Series 300, available from Intralox Corp., New Orleans, La. The endless belt 38 may also be made of other material such as stainless steel slats or a woven stainless steel. Provided that mechanical stirrers on not used on the draining belt 32, the draining belt 32 may also be made of a fabric or other similar material. As shown best in FIG. 7, the conveyer belts 32, 34 and 36 are each supported by a series of longitudinal static supports 40 and driven either by a geared electric motor or other means (not shown) via a series of drive sprockets 42. The speed of the belts 32, 34 and 36 can be varied either mechanically or electronically to control the depth and processing time of the cheese curd, depending upon the variety of cheese being manufactured.

Referring again to FIG. 1, as the raw cheese curd is transported from one end to the other along each of the conveyor belts 32, 34 and 36, whey is allowed to separate from the curd and drain into an intermediate collection pan 46 or the bottom pan 12 and is ultimately drained out of the system for disposal or further processing. The intermediate pans 46 prevent the whey from dripping from one belt to the other below it. At the downstream end of the belts 32 and 34, slides 48 invert the cheese curd and transfer it to the next belt for further processing.

Figure 2:
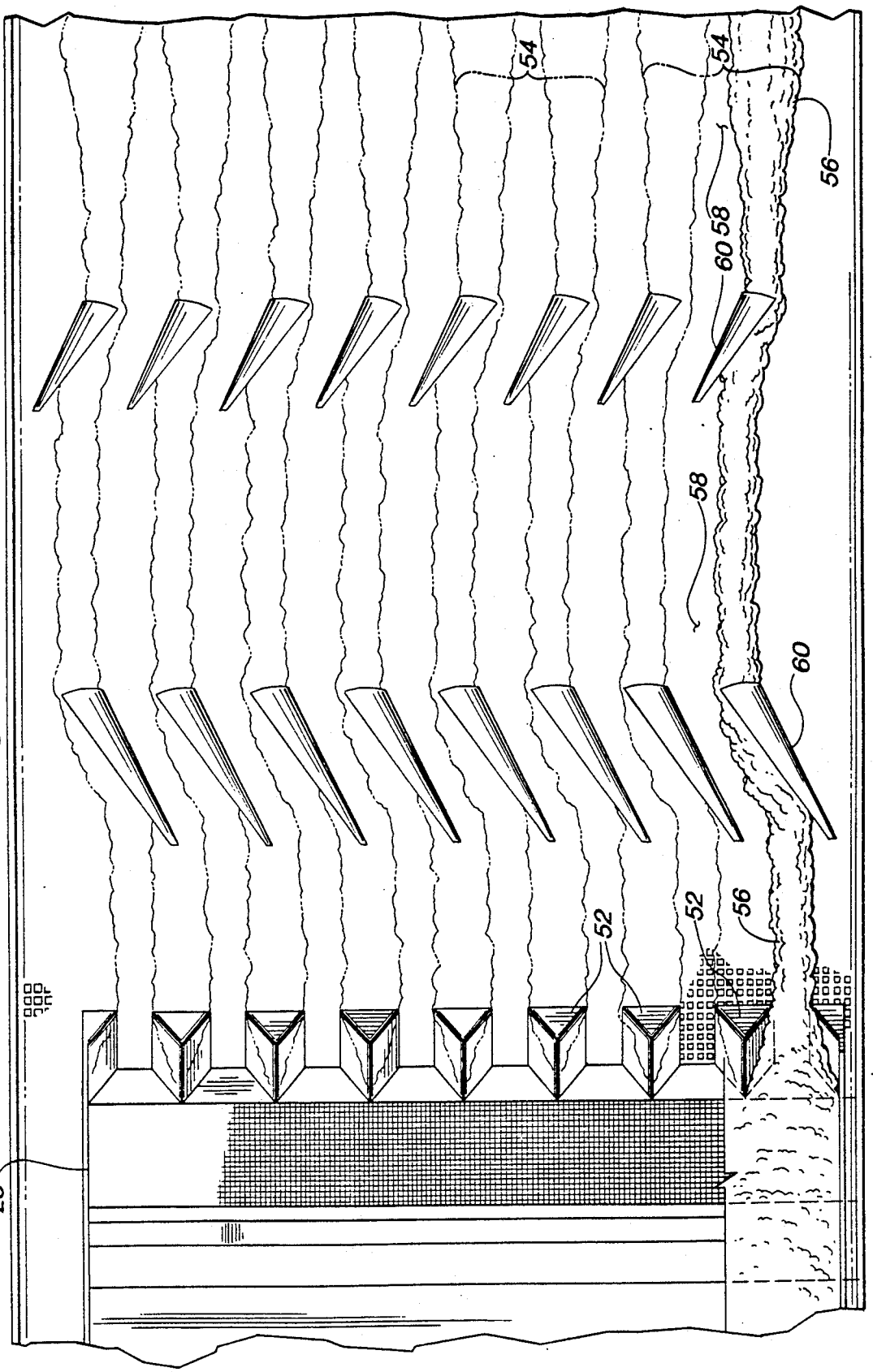
FIG. 2 is a top plan cut-away view of the draining belt of a cheese processing apparatus in accordance with the present invention showing the ribbon formation of the raw cheese curd.

Referring now to FIG. 2, at the lower end of the draining screen 28 is a divider means 50 that comprises a plurality of dividers 52 for separating the partially separated raw cheese curd into a series of ribbons 54 as the raw cheese curd flows through the dividers 52 onto the draining belt 32. In the preferred embodiment, the dividers 52 are triangular shaped wedges or guides for forming the raw cheese curd into the ribbons 54, each ribbon 54 consisting of a strip of raw cheese curd 56 and an associated strip of bare space 58 as shown in FIG. 2. As the ribbons 54 clear the dividers 52, the strips of cheese curd 56 will tend to sag and spread out under their own weight, all the time exuding whey that is free to flow away through the adjacent bare spaces 58. In the preferred embodiment, the dimensions of the ribbons 54 consist of a strip of cheese curd 56 that is 6" wide and 6"-8" thick and an associated strip of bare space 58 that is approximately 9" wide. The thickness of the ribbons 54 of cheese curd may be varied depending upon the speed of the draining belt 32, the angle of the inclined draining screen 28 and the rate at which the raw cheese curd is pumped into the supply means 24.

One or more deflection means 60 are located along the draining belt 32 for deflecting the ribbons 54 so that the strips of raw cheese curd 56 are deflected into the associated strips of bare space 58, thereby enhancing the drainage of the whey from the cheese curd. The deflection means 60 are placed at a distance along the draining belt 32 that is determined by the type of cheese product being made. The movement of the conveyor belt 32 carries the ribbons 54 past the deflection means 60. The deflection means 60 are positioned at such an angle as to cause the strips of cheese curd 56 to be displaced sideways and partially inverted into the associated strip of bare space 58. In an alternate embodiment shown in FIG. 4, each row of deflection means 60 are provided with a pair of transverse members 61 that may be used to adjust the angle of the deflections means 60 with respect to the strips of cheese curd 56. It will be apparent that other means of adjusting the angle of the deflection means 60, such as rotary controls or other types of electro-mechanical or hydraulic linkages would work equally as well.

The deflection means 60 provide for a gentle agitation of the strips of cheese curd 56 that allows the whey to drain form pockets that form in the cheese curd while minimizing the mechanical damage to the cheese curd itself. This reduction in mechanical damage facilitates the manufacture of high moisture cheese varieties and reduces losses of fat from the cheese curd. Because of the increase drainage efficiency associated with the use of the deflection means 60, it is possible to operate the cheese processing apparatus of the present invention with cheese curd layers of 6"-8", thereby reducing the overall size of the housing 10 necessary to achieve a given throughput of cheese product.

As shown in FIGS. 1 and 4, in the preferred embodiment the deflection means 60 comprises a row of plowshare-like blades 62, consisting of an inclined lever mechanism for each ribbon 54. The blades 62 are positioned across the direction of travel of the draining belt 32. The blades 62 are suspended from a support structure (not shown) above the draining belt 62 and may be lowered or rotated into position either just above or resting on the draining belt 62. In this embodiment, the blades 62 are slightly curved so as to invert or rotate the strip of cheese curd 56 as it comes into contact with the blades 62.

In another embodiment shown in FIG. 5, the deflection means 60 comprises a row of straight blades 64 that achieve the displacement of the strips of cheese curd 56 without any rotating effect caused by the blades 64. It should be noted that more than one series or type of deflection means 60 may be placed along the length of the draining belt 32, depending upon the degree of draining and matting required for the particular cheese product being processed.

In still another embodiment shown in FIG. 6, the deflection means 60 comprises a series of screw-like auger blades 64 on a transverse rod 66 that achieve the displacement of the strips of cheese curd 56 through the rotational effect of the auger blades 64. In this embodiment, the auger blades 64 are formed as a series of continuous screw-like augers, one for each of the strips 56. The auger blades 64 must be driven by an external power source other than the force of the strips of cheese curd 56 traveling along the draining belt 32 in order to prevent the auger blades 64 from walking with the strips 56 rather than rotating them.

In still another embodiment, the layer of cheese curd is not separated into ribbons prior to deflection. Instead, the first set of plowshares or augers are used to split the layer of cheese curd into strips as it is being displaced or rotated. In this embodiment, the strips are displaced into the open area on the belt created by rotating or displacing the adjacent strip. A subsequent row of plowshares or augers is used to deflect the ribbons into their associated strips of bare space on the conveyor belt.

Figure 7:
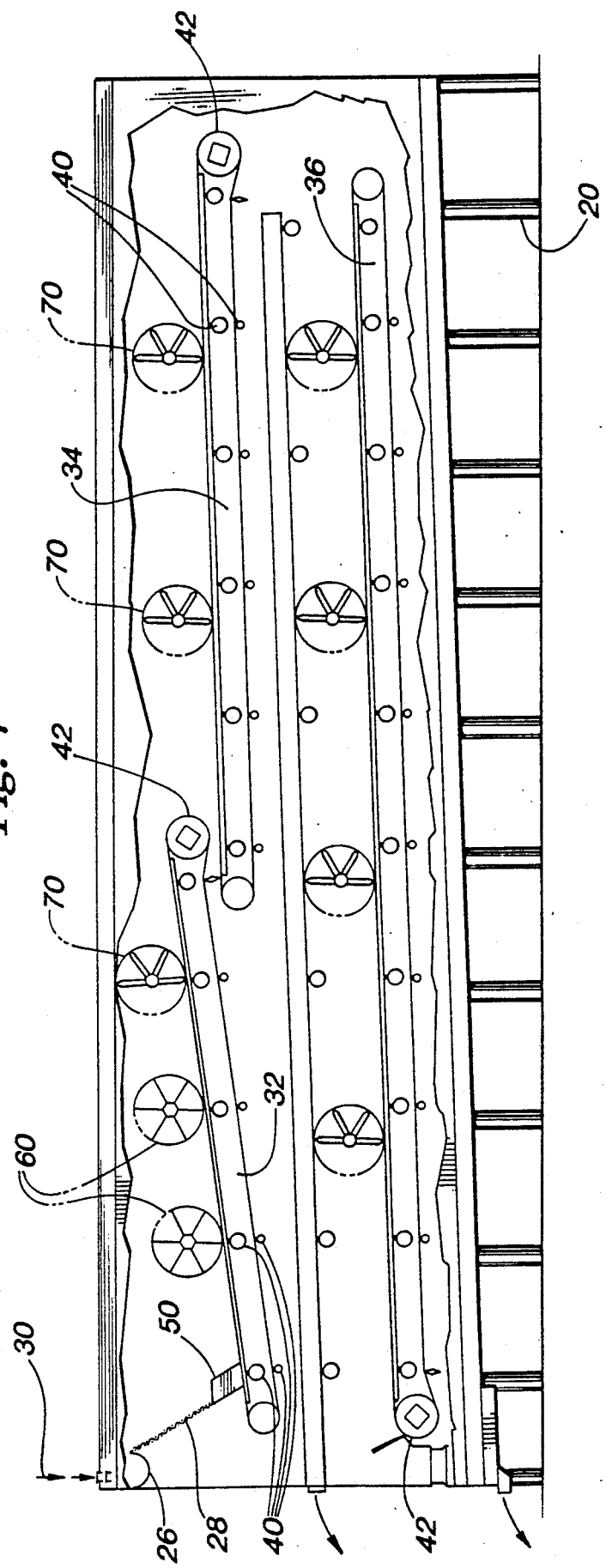
FIG. 7 is a simplified side view with parts cut-away of a lowprofile embodiment of the present invention showing alternative placement of the draining and matting belts.

After the draining process is completed, additional processing in the form of matting or stirring may occur. As the ribbons of cheese curd 54 travel along the draining belt 32 after interacting with the last of the deflection means 60, a longer period of residence on the draining belt 32 will cause the strips of cheese curd 56 to sag and spread out into the adjacent strips of bare space 58, thereby creating a more continuous layer of cheese curd prior to stirring. As shown in FIGS. 1 and 7, a series of pegs stirrers 70, driven by geared electric motors 72 or other means, may be placed at intervals throughout the remaining length of the draining belt 32 and lengths of the matting belts 34 and 36. These peg stirrers 70 are of a design such that if their use is not required for the particular cheese product being processed, the peg stirrers 70 can be parked in a position where they have no contact with the cheese product passing underneath. Finally, at the discharge end of the second matting belt 36, there may be positioned a guillotine device 80 and a transverse discharge conveyor 82 that together permit either slabs of matted curd or metered amount of granular curd to be discharged from the system.

Although the description of the preferred embodiment has been presented, it is contemplated that various changes could be made without deviating from the spirit of the present invention. Accordingly, it is intended that the scope of the present invention be dictated by the appended claims rather than by description of the preferred embodiment.

I claim:

1. A method for continuously processing raw cheese curd consisting of cheese curd and whey, comprising:

continuously supplying said raw cheese curd;

forming said raw cheese curd into a plurality of continuous ribbons, each ribbon comprising a strip of raw cheese curd and an associated strip of bare space; and receiving said ribbons on a conveyer belt at a first location and transporting said ribbons to a second location on said conveyor belt while allowing the whey to drain, whereby the drainage of the whey from the cheese curd is enhanced by the formation of the continuous ribbons.

2. The method of claim 1 further comprising the step of deflecting said ribbons as said ribbons are being transported between said first and second locations on said conveyor belt so that at least one of said strips of raw cheese curd is displaced into said associated strip of bare space, thereby enhancing the drainage of the whey from the cheese curd.

* * * * *